Patented Apr. 20, 1926.

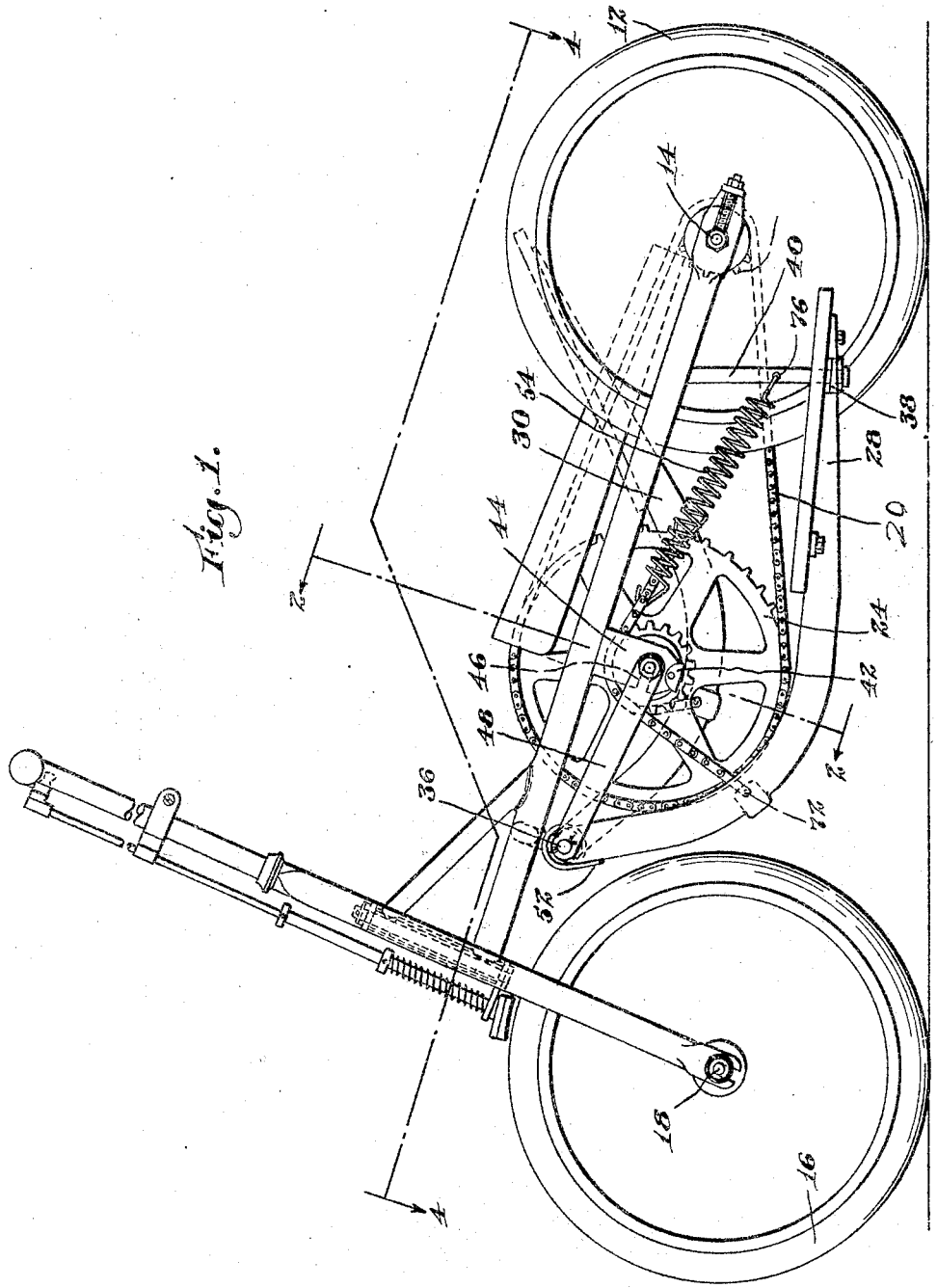

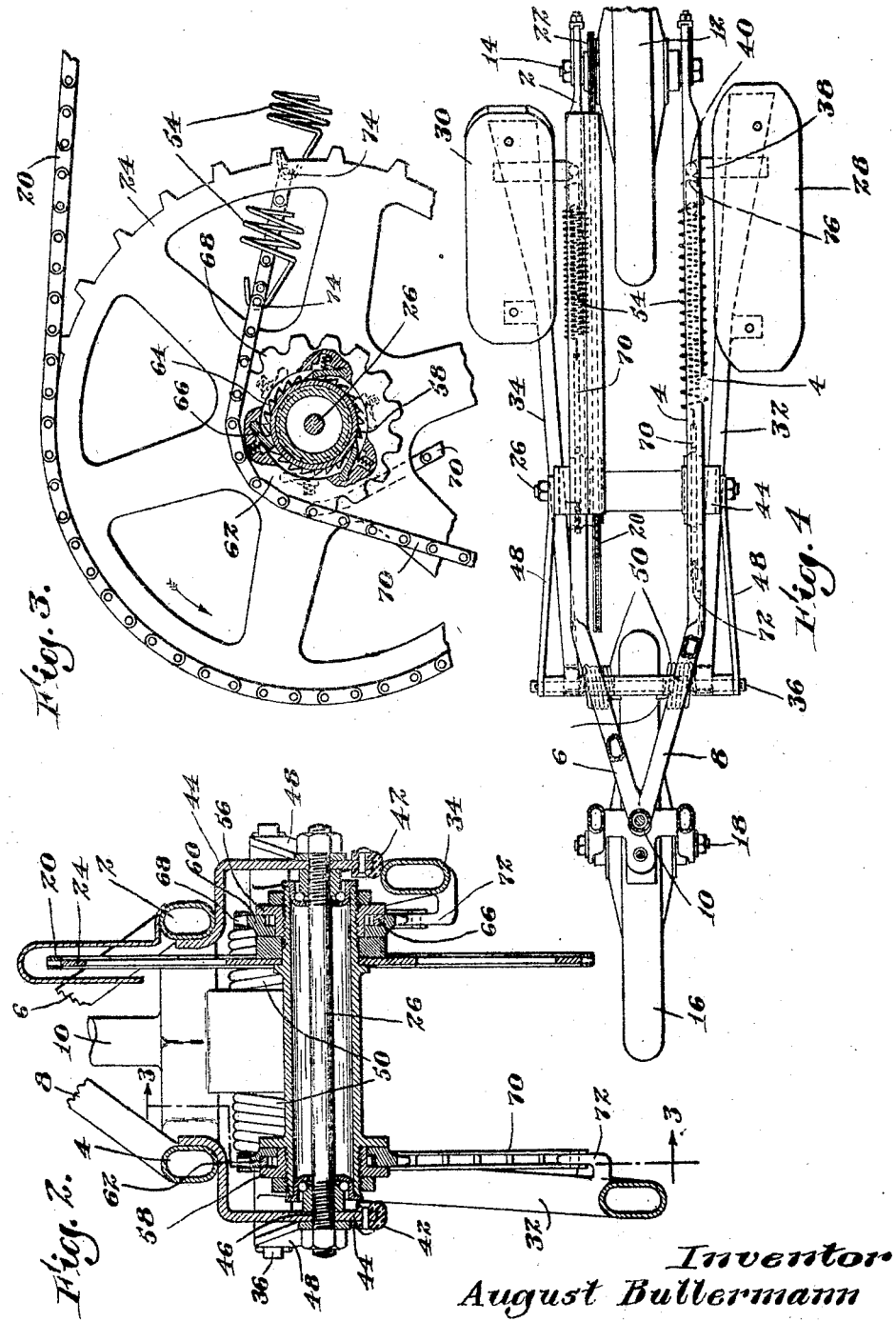

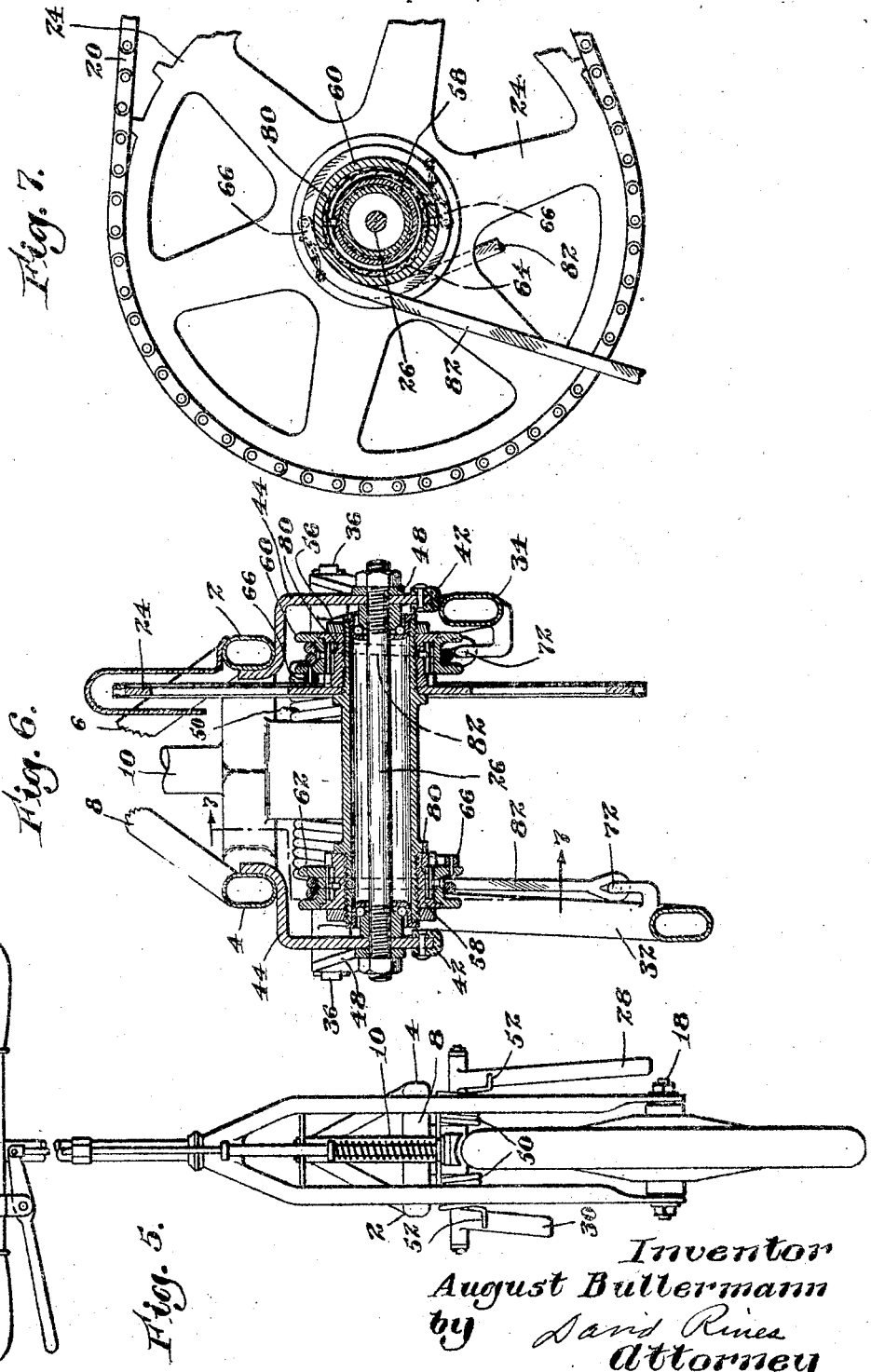

1,581,168

UNITED STATES PATENT OFFICE.

AUGUST BULLERMANN, OF HANNOVER, GERMANY, ASSIGNOR, BY MESNE ASSIGNMENTS, TO "BULLO" CYCLE-SCOOTER CONTROL OF AMERICA, INC., OF WOODHAVEN, NEW YORK, A CORPORATION OF DELAWARE.

SCOOTER.

Application filed September 25, 1925. Serial No. 58,681.

*To all whom it may concern:*

Be it known that I, AUGUST BULLERMANN, a citizen of Germany, and a resident of Hannover, Germany, have invented certain new and useful Improvements in Scooters (for which I have filed an application in Germany, July 24, 1924), of which the following is a specification.

The present invention relates to vehicles, and more particularly to foot-propelled vehicles of the scooter type.

An object of the present invention is to provide a new and improved scooter of the above-described character that shall be simple in construction, cheap to manufacture, easily and conveniently manipulated and very efficient in operation. Other and further objects will be described hereinafter and will be particularly pointed out in the appended claims.

With the above ends in view, the invention consists of the improved scooter a preferred embodiment of which is hereinafter described, illustrated in the accompanying drawings and defined in the appended claims.

In the drawings Fig. 1 is an elevation of a scooter constructed according to a preferred embodiment of the present invention; Fig. 2 is a section enlarged with respect to Fig. 1 taken upon the line 2—2 of Fig. 1, looking in the direction of the arrows; Fig. 3 is a similarly enlarged section taken upon the line 3—3 of Fig. 2, looking in the direction of the arrows; Fig. 4 is a section taken upon the line 4—4 of Fig. 1, looking in the direction of the arrows upon a reduced scale; Fig. 5 is a front elevation with parts omitted for clearness; Fig. 6 is a section corresponding to Fig. 2 of a modification, and Fig. 7 is a section taken upon the line 7—7 of Fig. 6, looking in the direction of the arrows.

The scooter of the present invention comprises a forked frame the arms of the fork of which, indicated at 2 and 4, converge at 6 and 8 toward a steering post 10. A rear wheel 12 is journaled upon an axle 14 between the rear ends of the arms 2 and 4. A steering wheel 16 is journaled upon an axle 18 at the forward end of the frame. The rear wheel is driven by a sprocket chain 20, mounted over a sprocket wheel 22 upon the rear axle 14 and over a sprocket driving gear 24 mounted upon a driving shaft 26.

The scooter is adapted to be foot-propelled by means of treadles 28 and 30 positioned upon opposite sides of the frame. The treadles are mounted upon the rear ends of treadle arms 32 and 34, respectively, that are pivoted at their forward ends about a pivotal rod 36 positioned between the forward axle 18 and the shaft 26. The treadles are adapted to be actuated by the operator's feet from an upper limiting position indicated by the treadle 30 in Fig. 1 to a lower limiting position indicated by the treadle 28 in the same figure. The lower limiting position is determined by means of stops 38 at the lower extremities of arms 40 projecting downwardly from the portions 2 and 4 of the frame. The upper limiting positions of the treadles are determined by shock-absorbing stops 42 positioned upon the lower extremities of arms 44 in which the driving shaft 26 is journaled. The shock-absorbing stops 42 may be constructed of any suitable material, like leather, rubber or springs. The arms 44 are provided with openings 46 within which the driving shaft 26 is adapted to be mounted, the driving shaft being held in place within the openings by arms 48 that connect the shaft 26 to the rod 36, as is more particularly illustrated in Fig. 1.

The scooter is adapted to be propelled by the operator's feet alternately actuating the treadles 28 and 30 downward toward the limiting stops 38 through connections with the driving shaft presently to be described. When one of the operator's feet is on one of the treadles forcing it downward about the pivotal rod 36, the other treadle will be lifted towards its upper position by means of springs 50 coiled about the rod 36 and engaging the forward portions of the treadle arms at 52, as shown more particularly in Figs. 1 and 5. The action of these springs may be aided by additional springs 54, as presently to be described, on the springs 54, if sufficiently strong, may perform the whole lifting function. The combination of this spring action with the shock-absorbing stops 42 results in a very efficient, quiet operation. It will be noted that by reason of the position of the treadles between the driving shaft and the rear axle, and the relative positions of the treadles and the upper and lower limiting stops that the parts are so constructed and arranged that the operator may stand upon one or the other treadle in a position most convenient to ready manipulation. This result is further aided by the fact that the pivotal rod 36 is positioned between the forward axle and the driving shaft and by the fact that the upper stops 42 are positioned slightly above the horizontal line joining the forward and rear axles.

In order to drive the driving shaft 26 from the treadles, two clutch members 56 and 58 are fixed at opposite ends of the driving shaft in any desired way, illustrated more particularly in Fig. 2, but which will not be described herein because forming in itself no part of the present invention. Cooperating with these clutch members are two movable clutch members 60 and 62. In the specific form of the invention illustrated the clutch members 56 and 58 are provided with ratchet teeth 64 and the loose clutch members 60 and 62 with the spring-pressed ratchet pawls 66. By reason of this construction the clutch members will be adapted to bind to cause rotation of the driving shaft when the clutch members 60 and 62 are rotated in the direction of the arrow in Fig. 3 and will be permitted to turn loosely with respect to the clutch members 56 and 58 when rotated in the reverse direction. Any equivalent clutching mechanism for effecting this result may be employed without departing from the invention.

According to the preferred embodiment of the present invention the loose clutch members 60 and 62 are each provided with sprocket teeth 68 meshing with sprocket chains 70. One end of each of the chains 70 is secured to the forward end of each treadle arm at 72. The rear end of each sprocket chain 70 is connected at 74 by the coil spring 54. The other end of each coil spring is secured at 76 to one of the depending arms 40. During the downward movement of each treadle, therefore, the corresponding sprocket chain 70 will cause the corresponding ratchet member 60 or 62 to engage the corresponding fixed clutch member 56 or 58, thereby driving the driving shaft in the direction of the arrow, Fig. 3, and causing propulsion of the scooter. When the foot is raised the corresponding spring 50 will cause the return of the treadle to its upper position and the spring 54 will insure the return of the corresponding loose clutch member 60 or 62 in readiness for the next downward movement of the treadle. As before described, the spring 54 may be designed to perform the whole function of returning the treadle and the loose clutch member. It is preferred, however, to use the two springs 50 and 54 as before described.

According to the modification illustrated in Figs. 6 and 7, the loose clutch members are biased in one direction by coil springs 80 which thus perform the function of returning the clutch member 60 or 62 freely, and movement of these clutch members in the opposite direction under the influence of the treadle is effected by means of cables, or the like, 82 fastened at 72 to the forward ends of the treadles as before described, the operation being in other respects the same.

Other modifications, also, will occur to persons skilled in the art, and all such are considered to fall within the spirit and scope of the present invention as defined in the appended claims.

What is claimed is:

1. A vehicle of the character described having, in combination, a vehicle frame, a steering wheel at the forward end of the frame, a rear wheel at the rear end of the frame, a driving shaft for driving the rear wheel, two treadle arms pivoted to the frame between the steering wheel and the driving shaft and extending from their pivotal points rearward towards the rear wheel, the rear ends of the treadle arms being provided with treadles, the treadle arms being adapted to occupy a normal upper limiting position beneath the driving shaft, two one-way clutches for driving the driving shaft in one direction only, means extending upward from the forward end of each treadle arm to connect the treadle arm with the corresponding clutch, whereby downward actuation of each treadle from the normal position will cause actuation of the corresponding clutch through the corresponding connecting means to effect the driving of the driving shaft, and means for resiliently returning the treadles to the normal positions.

2. A vehicle of the character described having, in combination, a vehicle frame, a steering wheel at the forward end of the frame, a rear wheel at the rear end of the frame, a driving shaft journaled intermediately of the frame, means connecting the driving shaft with the rear wheel to cause the rear wheel to be driven from the driving shaft, two treadle arms pivoted to the frame between the steering wheel and the driving shaft and extending from their pivotal points rearward towards the rear wheel, the treadle arms each having a treadle between the driving shaft and the rear wheel, the treadle arms each being adapted to occupy a normal upper limiting position beneath the driving shaft, two one-way clutches for driving the driving shaft in one direction only, means extending upward from each treadle arm to connect the treadle arm with the corresponding clutch, whereby downward actuation of each treadle from the normal position will cause actuation of the corresponding clutch through the corresponding connecting means to effect the driving of the driving shaft, and means for resiliently returning the treadles to the normal positions.

3. A vehicle of the character described having, in combination, a vehicle frame, a steering wheel at the forward end of the frame, a rear wheel at the rear end of the frame, a driving shaft for driving the rear wheel journaled in the frame, two treadles pivoted at an intermediate portion of the frame and extending from their pivotal points rearward towards the rear wheel, an upper limiting stop for each treadle carried below the frame between the pivotal points and the rear wheel, a lower limiting stop for each treadle carried below the frame between the upper limiting stop and the rear wheel, whereby the treadles are adapted to occupy positions between upper and lower limiting stops entirely below the frame, means extending upward from each treadle arm to connect the treadle arm with the driving shaft, whereby downward actuation of each treadle from the upper limiting stop towards the lower limiting stop will effect the driving of the driving shaft, and means for resiliently returning the treadles into engagement with the upper limiting stops.

4. A vehicle of the character described having, in combination, a vehicle frame, a steering wheel at the forward end of the frame, a rear wheel at the rear end of the frame, a driving shaft journaled intermediately of the frame, means connecting the driving shaft with the rear wheel to cause the rear wheel to be driven from the driving shaft, two treadles pivoted to the frame between the steering wheel and the driving shaft and extending from their pivotal points rearward towards the rear wheel, the treadles each being adapted to occupy a normal upper limiting position beneath the driving shaft, two clutch members fixed to the driving shaft, two clutch members freely movable in one direction and adapted to cooperate with the fixed clutch members in the opposite direction to drive the driving shaft, means extending upwards from each treadle to connect the treadle with the corresponding cooperating clutch member, whereby downward actuation of each treadle from the normal position will cause the corresponding fixed and cooperating clutch members through the corresponding connecting means to effect the driving of the driving shaft, and means for resiliently returning the treadles to the normal positions, the cooperating clutch members moving freely in the said one direction during the return movement of the treadles.

5. A vehicle of the character described having, in combination, a vehicle frame, a steering wheel at the forward end of the frame, a rear wheel at the rear end of the frame, a driving shaft journaled intermediately of the frame above the line joining the axles of the steering wheel and the rear wheel, means connecting the driving shaft with the rear wheel to cause the rear wheel to be driven from the driving shaft, two treadle arms pivoted to the frame between the steering wheel and the driving shaft and extending from their pivotal points rearward towards the rear wheel, the treadle arms each having a treadle between the driving shaft and the rear wheel, the treadle arms each being adapted to occupy a normal upper limiting position beneath the driving shaft, two toothed members fixed to the driving shaft, two cooperating toothed members freely rotatable in one direction about the driving shaft and adapted to engage the teeth of the fixed toothed members when rotated in the opposite direction to drive the driving shaft, means extending upward from each treadle arm to connect the treadle arm with the corresponding cooperating toothed member, whereby downward actuation of each treadle from the normal position will cause the corresponding fixed and cooperating toothed members through the corresponding connecting means to effect the driving of the driving shaft, and a spring for returning each treadle to the normal position, the cooperating toothed members rotating freely in the said one direction about the driving shaft during the return movement of the treadles.

6. A vehicle of the character described having, in combination, a vehicle frame, a steering wheel at the forward end of the frame, a rear wheel at the rear end of the frame, a driving shaft journaled intermediately of the frame, means connecting the driving shaft with the rear wheel to cause the rear wheel to be driven from the driving shaft, two treadle arms pivoted to the frame between the steering wheel and the driving shaft and extending from their pivotal points rearward towards the rear wheel, the treadle arms each having a treadle between the driving shaft and the rear wheel, an upper limiting stop for each treadle carried below the frame between the pivotal points and the rear wheel, a lower limiting stop for each treadle carried below the frame between the upper limiting stop and the rear wheel, whereby the treadles are adapted to occupy positions between upper and lower limiting stops entirely below the frame, two one-way clutches for driving the driving shaft in one direction only, means extending upward from a point of each treadle arm between the pivotal point of the treadle arm and the corresponding upper limiting stop to connect the treadle arm with the corresponding clutch, whereby downward actuation of each treadle from the upper limiting stop towards the lower limiting stop will cause actuation of the corresponding clutch through the corresponding connecting means to effect the driving of the driving shaft, and means resiliently connecting the connecting means and the lower limiting stops for resiliently returning the treadles into engagement with the upper limiting stops.

7. A vehicle of the character described having, in combination, a vehicle frame, a steering wheel at the forward end of the frame, a rear wheel at the rear end of the frame, a driving shaft for driving the rear wheel, a treadle adapted to occupy a normal position, means connecting the treadle with the driving shaft whereby actuation of the treadle from the normal position will effect the driving of the driving shaft, means for resiliently returning the treadle to the normal position, and shock-absorbing means for cushioning the return movement of the treadle to the normal position.

8. A vehicle of the character described having, in combination, a vehicle frame, a steering wheel at the forward end of the frame, a rear wheel at the rear end of the frame, a driving shaft for driving the rear wheel journaled in the frame, two treadles pivoted at an intermediate portion of the frame and extending from their pivotal points rearward towards the rear wheel, an upper limiting stop for each treadle carried below the frame between the pivotal points and the rear wheel, a lower limiting stop for each treadle carried below the frame between the upper limiting stop and the rear wheel, whereby the treadles are adapted to occupy positions between the upper and lower limiting stops entirely below the frame, two one-way clutches for driving the driving shaft in one direction only, means extending upward from each treadle to connect the treadle with the corresponding clutch, whereby downward actuation of each treadle from the upper limiting stop towards the lower limiting stop will cause actuation of the corresponding clutch through the corresponding connecting means to effect the driving of the driving shaft, means for resiliently returning the treadles towards the upper limiting stops, and shock-absorbing means for cushioning the return movement of the treadles.

9. A vehicle of the character described having, in combination, a vehicle frame, a steering wheel at the forward end of the frame, a rear wheel at the rear end of the frame, a driving shaft journaled intermediately of the frame, means connecting the driving shaft to the rear wheel to cause the rear wheel to be driven from the driving shaft, two treadles pivoted to the frame between the steering wheel and the driving shaft and extending from their pivotal points rearward towards the rear wheel, the treadles each being adapted to occupy a normal position, the driving shaft having two one-way clutches driving the driving shaft in one direction only, means flexibly connecting each clutch to one of the treadles, whereby actuation of each treadle from the normal position will cause actuation of the corresponding clutch through the corresponding flexible connection to effect the driving of the driving shaft, and means resiliently connecting the flexible connecting means with the frame to cause the return of the treadles to their normal positions.

10. A vehicle of the character described having, in combination, a vehicle frame, a steering wheel at the forward end of the frame, a rear wheel at the rear end of the frame, a driving shaft journaled intermediately of the frame, means connecting the driving shaft to the rear wheel to cause the rear wheel to be driven from the driving shaft, two treadles pivoted to the frame between the steering wheel and the driving shaft and extending from their pivotal points rearward towards the rear wheel, the treadles each being adapted to occupy a normal position, the driving shaft having two ratchet-and-pawl clutches for driving the driving shaft in one direction only, a sprocket wheel connected with each clutch, a sprocket chain connected with each sprocket wheel, one end of each sprocket chain being connected with one of the treadles between the pivotal point of the corresponding treadle and the corresponding sprocket wheel, and a spring connecting the other end of each sprocket chain with a rear portion of the frame, whereby actuation of each treadle from the normal position will cause actuation of the corresponding clutch through the corresponding sprocket chain to effect actuation of the driving shaft and whereby the treadles are adapted to be returned to their normal positions by the springs.

11. A vehicle of the class described having, in combination, a vehicle frame having two arms connected together at their forward ends and extending rearwardly, a steering post at the forward end of the frame, a steering wheel carried in the steering post, a rear wheel carried between the rear ends of the arms having a sprocket wheel, the arms carrying downward projecting limiting members intermediately disposed between the wheels, a driving shaft journaled in the downward projecting members having a sprocket wheel disposed between the arms, a sprocket chain connecting the sprocket wheels, a rod secured to the arms between the steering post and the driving shaft having ends projecting beyond the sides of the arms, a treadle pivoted to each end of the rod and extending from the rod rearward towards the rear wheel, the driving shaft having a ratchet-and-pawl clutch disposed adjacent to each arm for driving the driving shaft in one direction only, a sprocket wheel connected with each clutch, a sprocket chain connected with each sprocket wheel, one end of each sproket chain being connected with one of the treadles between the rod and the corresponding clutch sprocket wheel, a limiting stop member depending from each arm near the rear end of the corresponding arm, and a spring connecting the other end of each sprocket chain with the corresponding stop member and adapted to maintain the corresponding treadle in a normal position in contact with the corresponding downward projecting member, whereby actuation of each treadle from the normal position will cause the actuation of the corresponding clutch through the corresponding sprocket chain to effect actuation of the driving shaft, the treadles being adapted to be returned to their normal positions by the springs.

In testimony whereof, I have hereunto subscribed my name this 9th day of September, 1925.

AUGUST BULLERMANN.